United States Patent [19]

Hector, Sr. et al.

[11] Patent Number: 5,350,273
[45] Date of Patent: Sep. 27, 1994

[54] WIND ENERGY COLLECTION SYSTEM

[76] Inventors: Francis N. Hector, Sr., 101 South Ave., Box 23, Unit 701, Attleboro, Mass. 02703; Francis N. Hector, Jr., 905 S. Ridge Dr., Apt. #203, Delray Beach, Fla. 33444

[21] Appl. No.: 110,220

[22] Filed: Aug. 23, 1993

[51] Int. Cl.$^5$ ............................................. F03B 15/06
[52] U.S. Cl. ................... 415/4.1; 415/4.2; 416/39; 416/DIG. 4
[58] Field of Search ............ 415/2.1, 4.1, 4.2, 4.3, 415/4.4, 4.5, 905, 907, 908; 416/9–13, 15–16, 39, 224, DIG. 4

[56] References Cited

U.S. PATENT DOCUMENTS

| | | | |
|---|---|---|---|
| 1,455,950 | 5/1923 | Willman | 415/2.1 |
| 2,409,439 | 10/1946 | Law | 415/4.1 |
| 3,988,072 | 10/1976 | Sellman | 415/2.1 |
| 4,323,331 | 4/1982 | Schachle et al. | 416/9 |
| 4,421,452 | 12/1983 | Rougemont | 415/4.2 |
| 4,449,053 | 5/1984 | Kutcher | 416/142 |
| 4,494,009 | 1/1985 | Yukl | 416/DIG. 4 |
| 4,789,297 | 12/1988 | Mrasek | 415/4.2 |
| 5,009,569 | 4/1991 | Hector, Sr. et al. | 415/4.1 |
| 5,083,899 | 1/1992 | Koch | 415/2.1 |

FOREIGN PATENT DOCUMENTS

| | | | |
|---|---|---|---|
| 0192863 | 8/1986 | Japan | 416/DIG. 4 |
| 0481014 | 2/1938 | United Kingdom | 416/9 |
| 1518151 | 7/1978 | United Kingdom | 416/DIG. 4 |
| 2185786 | 7/1987 | United Kingdom | 415/4.2 |

*Primary Examiner*—Edward K. Look
*Assistant Examiner*—Christopher Verdier
*Attorney, Agent, or Firm*—George A. Bode; Michael L. Hoelter

[57] ABSTRACT

A wind-driven apparatus for converting the kinetic energy of wind into mechanical energy. This invention incorporates a wind collector that is rotated upon an elevated turntable in order to position the wind collector as required. This turntable incorporates both a covered track and casters so as to provide weather protection. Additionally, a shroud secured to the entrance to the wind collector helps direct the wind energy against the wind collector.

5 Claims, 8 Drawing Sheets

WIND ENERGY COLLECTION SYSTEM

BACKGROUND OF THE INVENTION

1. Field of the Invention

The present invention relates to the conversion of the kinetic energy in a moving fluid to rotational mechanical energy and more particularly to improvements to a wind driven apparatus for the generation of electricity, pumping water, or other purposes.

2. General Background

On Apr. 23, 1991, U.S. Pat. No. 5,009,569 was granted to the above-named inventors. This patent pertained to an apparatus for the conversion of wind energy into rotational mechanical energy. It described a collection funnel that directed the wind against a collector which, upon rotation, converted this wind energy into mechanical energy. Various specific features were described in this patent including a series of blow-through panels that were configured to open at a preselected wind pressure. Additionally, this patent described the operation of an open exhaust area immediately downstream the collector so as to prevent any backpressure from developing within the funnel. Furthermore, a specific configuration of a directional vane for aligning the open front of the funnel with respect to the direction of wind flow was described.

Since the issuance of this patent, several improvements and new features have been added to this original apparatus. First, the funnel entrance and the means for channelling the wind against the collector have been totally redesigned so as to prevent the wind forces from spilling around the funnel thereby reducing its effectiveness. Second, the means for rotating the wind collector so as to be in alignment with the wind has been drastically altered. It is now possible to rotate the wind collector in a 360 degree circle while requiring considerably less space than that specified in the above patent. Third, the wind collector is now elevated so as to avoid any turbulence or obstruction that may occur as a result of being mounted close to the ground. Fourth, the primary areas of the collector exposed to the elements are now protected from any ice build-up which may hinder or restrict the operation of the wind collector. This means of ice protection also extends to the rotational means used to rotate the collector in order to keep it in alignment with the wind. Fifth, a pivotable top deflector is incorporated so as to provide rain, snow, icing and excessive wind protection for the apparatus. Sixth, the fixed intake funnel has now been replaced with adjustable side panels so as to enable the flow of the wind against the collector to be adjusted as needed depending upon wind availability. Seventh, this improved wind collector can be equipped with sequentially phased generators or alternators which will go on-line or off-line as needed in response to the amount of wind energy collected.

These and many more improvements and or new features to the original design specified in the above patent are now described herein.

SUMMARY OF THE PRESENT INVENTION

The preferred embodiment of the apparatus of the present invention solves the aforementioned problems in a straightforward and simple manner. What is disclosed is a wind-driven apparatus for generating rotational mechanical energy from a wind flow stream. This apparatus incorporates a rotatable wind collector having a first axis of rotation, an entrance, an exit, and a plurality of curved vanes located about its outer circumference. This rotatable wind collector is supported upon a framework which, in turn, is supported upon a turntable elevated above the ground. The turntable functions to turn or position the wind collector as desired depending upon wind direction. This turntable also incorporates covered rolling means, which include a track with casters rolling thereon, for pivoting the wind collector about a second axis of rotation. These first and second axes of rotation are generally orthogonal with respect to each other. A shroud surrounds the entrance to the rotatable wind collector and directs the wind forces onto the wind collector. This shroud consists of pivotable upper and lower shroud members and fixed side members with these fixed side members extending both above and below the circumference of the rotatable wind collector.

BRIEF DESCRIPTION OF THE DRAWING

For a further understanding of the nature and objects of the present invention, reference should be had to the following description taken in conjunction with the accompanying drawing in which like parts are given like reference numerals and, wherein.

DETAILED DESCRIPTION OF THE PREFERRED EMBODIMENT

Referring initially to FIGS. 1-5, there is illustrated wind turbine 10 which includes a rotatable wind collector 12, a channeling shroud 14, framework 16, and turntable support means 18. The purpose of wind turbine 10, which will be described in greater detail below, is to convert wind energy into mechanical energy by channeling the wind so as to impinge upon wind collector 12, thereby causing it to rotate. Such rotation will, in turn, drive mechanical means 20 such as a pump, generator, alternator, or the like.

Figure 1:
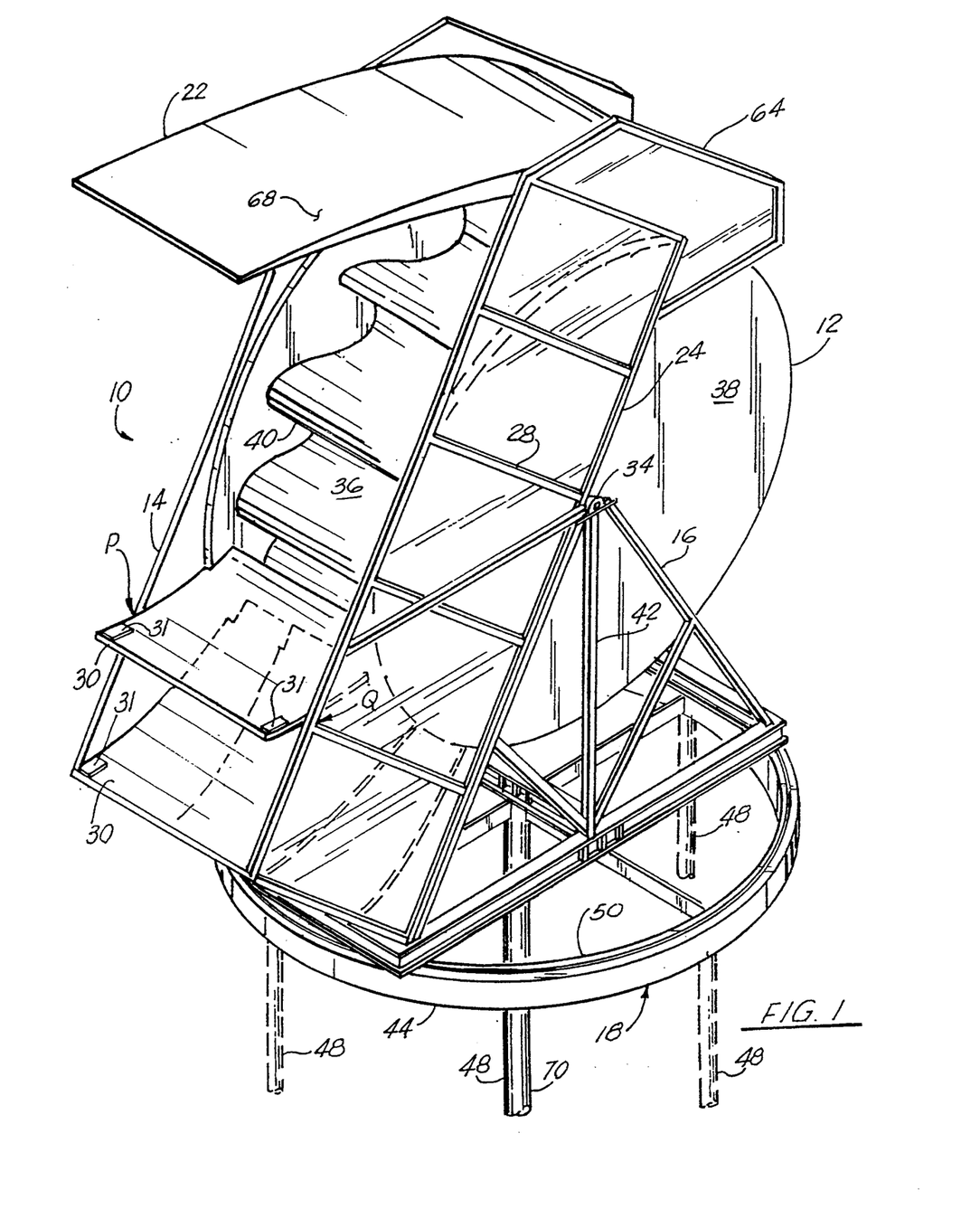
FIG. 1 is a pictorial or perspective view of the preferred embodiment of the present invention illustrating the various improvements to the original design.
Figure 1A:
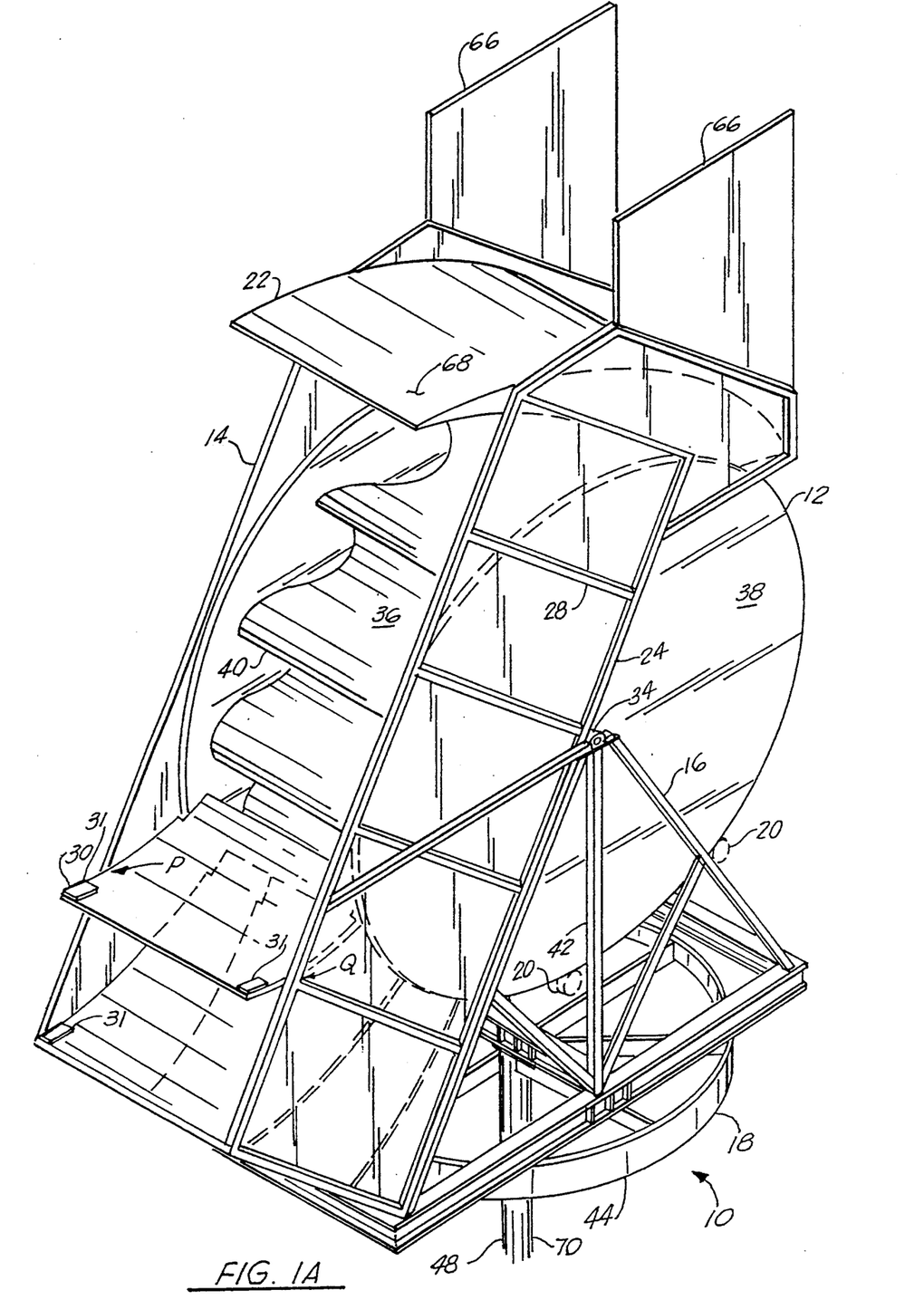
FIG. 1A is a pictorial or perspective view of an alternate embodiment of the present invention illustrating the various improvements to the original design.
Figure 2:
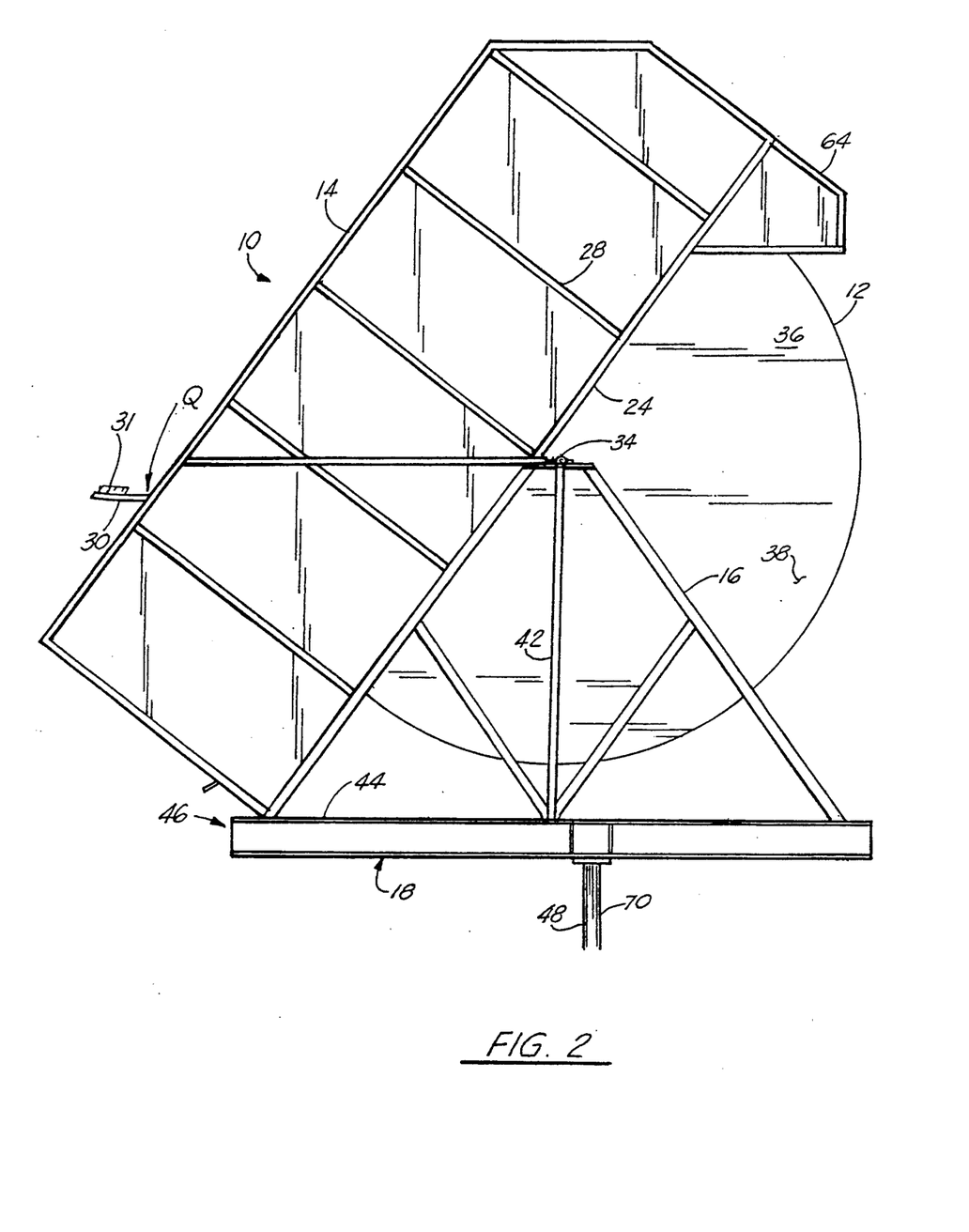
FIG. 2 is a side pictorial view of the present invention illustrated in FIG. 1.
Figure 3:
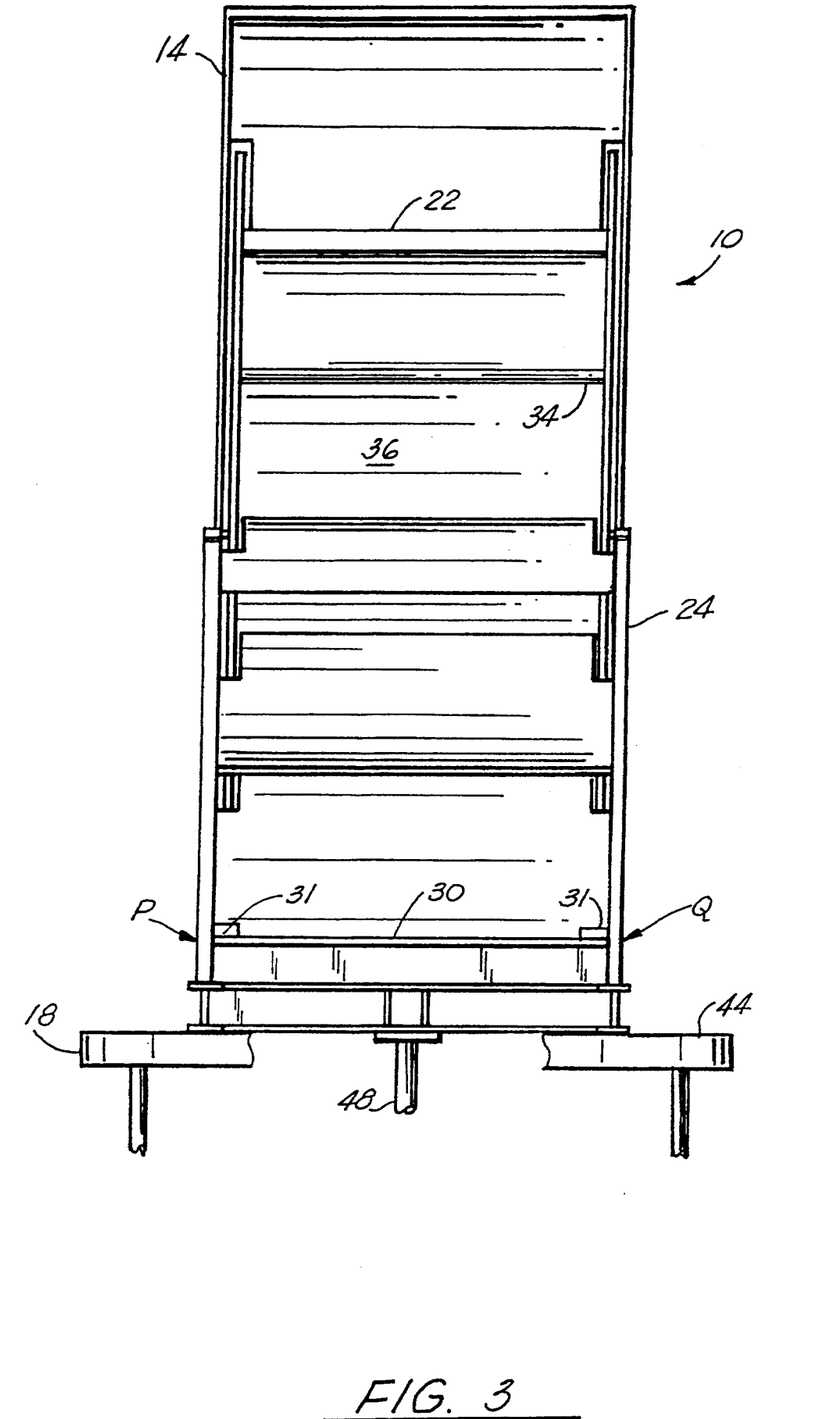
FIG. 3 is a front pictorial view of the present invention illustrated in FIG. 1.

FIGS. 1 and 1A illustrate nearly identical embodiments, with the main difference between them being upper channeling shroud 22 and balance plates 66. In FIG. 1A, upper channeling shroud 22 is configured more like an awning over the entrance to wind collector 12 such that when it is pivoted downward, it covers only a portion of the entrance to wind collector 12. In contrast, upper channeling shroud 22 in FIG. 1 extends outwardly further and when pivoted downwardly will protect, cover or enclose substantially the entire entrance to wind collector 12 in the case of high wind, extreme weather, or the like. In both configurations, however, upper channeling shroud 22 extends outwardly towards the front of wind turbine 10 so as to provide rain, snow, icing, and other weather related protection for wind turbine 10. Balance plates 66 extend vertically from shroud 14 above shroud 22.

In both FIGS. 1 and 1A, end plates 24 form a part of channeling shroud 14 and extend beyond the circumference of wind collector 12. The purpose of these fixed end plates 24 is to enhance the channeling of the wind forces which may otherwise tend to escape the entrance to wind collector 12. Without such enlarged end plates 24, these wind forces are more likely to be deflected around or toward the rear portion of wind turbine 10, thereby not contributing to the conversion of such wind energy to mechanical energy.

These end plates 24, and in fact all of channeling shroud 14, may be constructed of similar material such as metal or the like. Bracing or reinforcement members 28 may also be incorporated as needed to stiffen such components and to retain their rigidity under load.

Lower channeling shroud 30 consists of several curved plates that direct the wind forces into the entrance to wind collector 12. These lower channeling shrouds 30 may each be differently curved depending upon their location and the particular area of wind collector 12 onto which they are to direct their respect wind forces. Additionally, each of these lower channeling shrouds 30 are separately pivotable about POINTS P and Q so as to be adjustable as needed.

To assist in the positioning of upper and lower channeling shrouds 22 and 30, a series of counter or balance weights 31 are provided so that these lower channeling shrouds 22 and 30 will remain in their pivoted position. These weights 31 are required so as to offset the wind forces impinging upon these components and to enable these components to deflect the wind energy away from the entrance to wind collector 12. By incorporating such weights 31, these components can be pivoted to an alternative position so as to protect wind collector 12 during periods of high wind speed and to provide for wind flow control during operation.

As a result of this configuration, channeling shroud 14 converges upon the opening to wind collector 12 from both the top and bottom via pivotable upper and lower channeling shrouds 22 and 30. End plates 24 do not so pivot and are fixed in their desired position although this position may be at an angle to the entrance to wind collector 12. While these end plates 24 do not pivot, they can form sides which also converge upon the entrance to wind collector 12. Additionally, these end plates 24, as previously stated, extend beyond the circumference of wind collector 12, thereby effectively channeling wind energy which may otherwise escape the entrance to wind collector 12.

Figure 4:
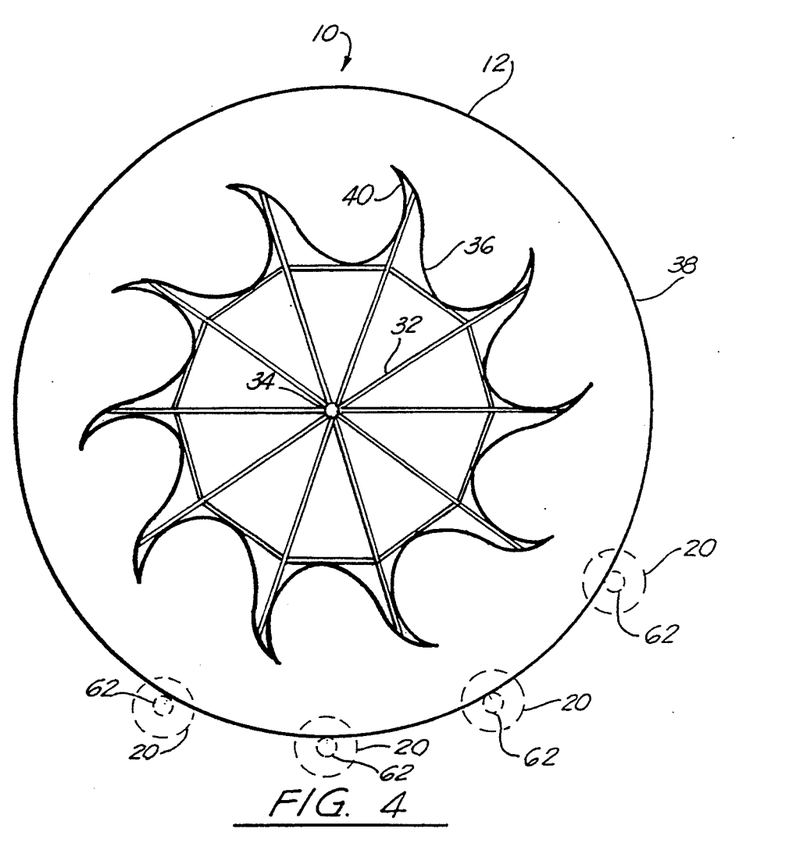
FIG. 4 is a side pictorial view of the wind collector, with many elements of the wind turbine removed for clarity, illustrating its manner of support within the wind turbine.
Figure 5:
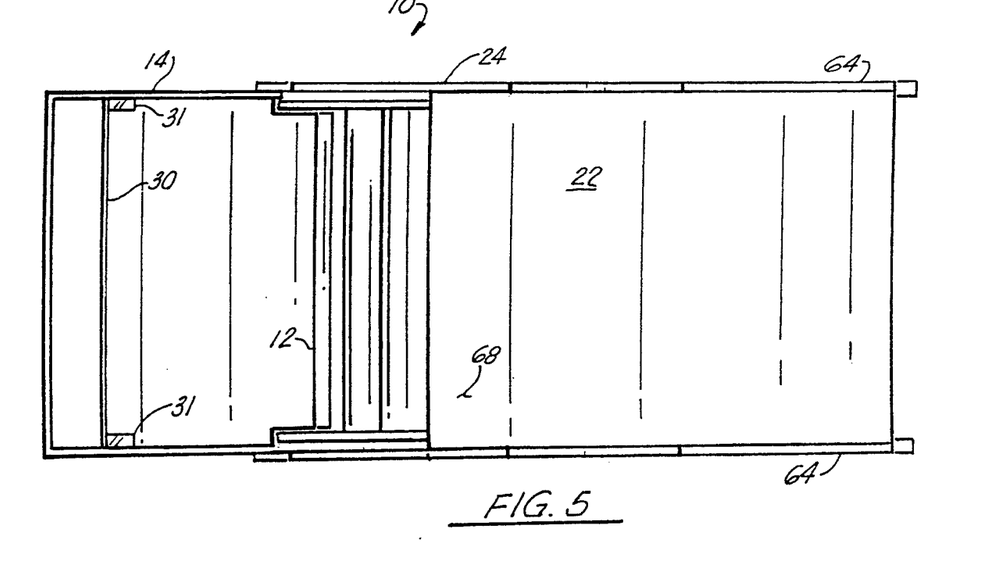
FIG. 5 is a top pictorial view of the present invention illustrated in FIG. 1.
Figure 8:
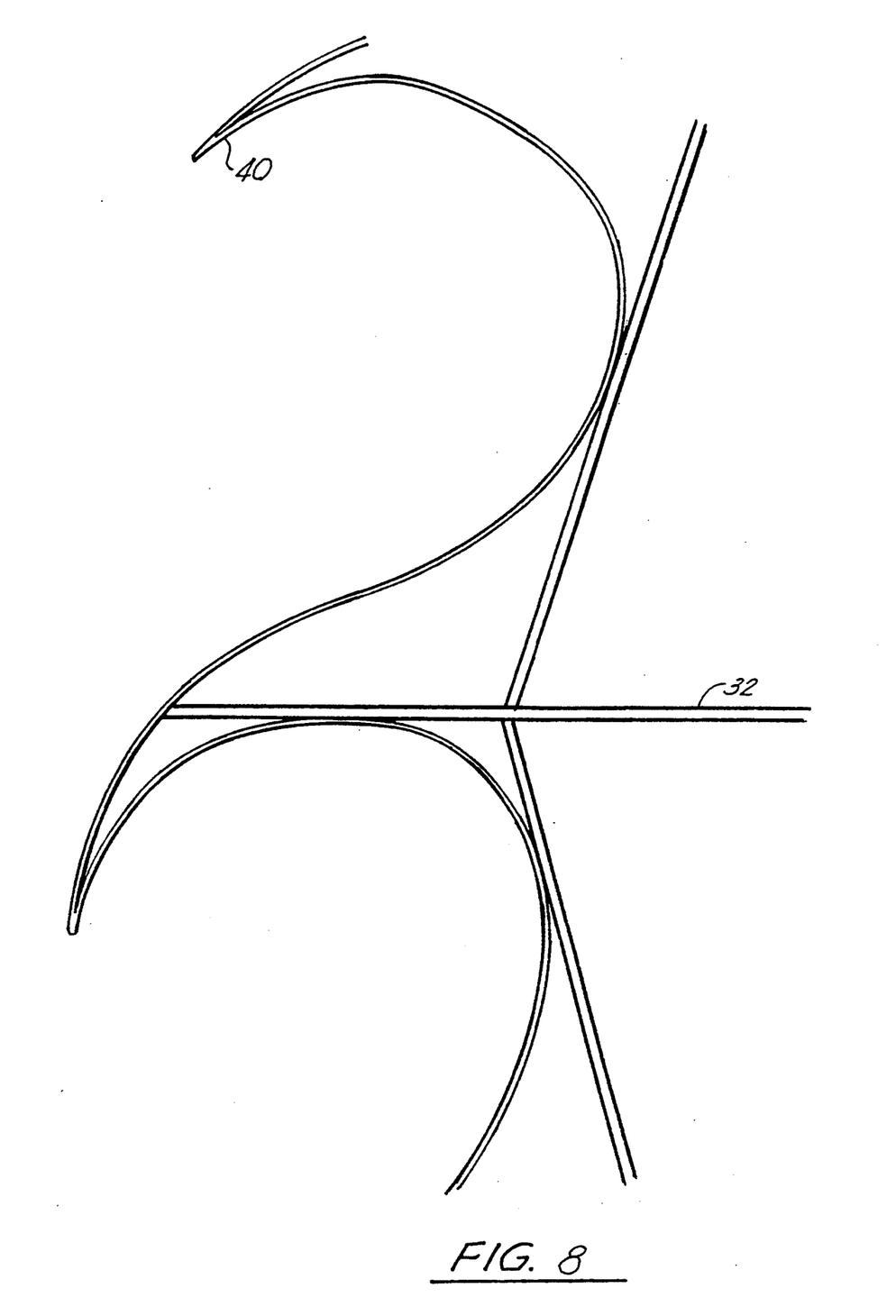
FIG. 8 is a pictorial view, partially broken away, of a detail of the wind collector; and, FIG. 9 is a pictorial side view illustrating the operation of the wind turbine.

Wind collector 12 is illustrated as being of the closed type, but it may also be an open type wind collector, both of which are manufactured using a series of spokes 32 extending radially from a central axis or drive shaft 34 (best seen in FIGS. 4 and 8). In the embodiment illustrated, wind collector 12 consists of a drum 36 having closed sides 38 that do not permit the impacting wind forces to pass therethrough. Intermediate these closed sides 38 are a series of elongated curved vanes 40 regularly spaced about central axis or drive shaft 34. These curved vanes 40 are configured to capture the wind energy directed towards them via channeling shroud 14, thereby causing drum 36 to rotate. Such rotation of drum 36 will, in turn, cause central axis or drive shaft 34 to also rotate, thereby converting the impacting wind energy into rotational mechanical energy via mechanical means 20. The extended diameter of vanes 40 channels "surplus" wind to the rear of collector 12 where it impacts the receptor.

While the curvature of each of these vanes 40 are usually tailored to the average wind speed expected to be encountered, some of these vanes 40 may also have a double curvature so as to increase the amount of wind energy captured. In an alternate configuration, it is possible to configure these curved vanes 40 so that they alternately extend from opposite sides 38 of drum 36 yet do not reach across and engage the opposite side wall. In this fashion, vanes 40 are deemed to be "dual vanes". Furthermore, these vanes may be reduced in size due to their greater capture ability. With this configuration, it then becomes possible to incorporate vanes that may be biased to collapse or straighten out when impacted upon by a pre-selected high wind speed. This condition will result in wind collector 12 rotating slightly off-wind during these periods and will serve as a means of high wind protection.

Of course, the size and shape of vanes 40 will vary depending upon the size and shape of wind collector 12. The number and relative dimension or spacing between adjacent vanes 40 will also generally vary from wind turbine to wind turbine depending upon the circumference of wind collector 12.

Framework 16 is illustrated as generally consisting of a series of structural members 42 configured to support wind collector 12 in an elevated position. This framework 16 is itself supported upon a turntable 44 that enables the entire wind turbine 10 to rotate about a vertical axis as needed in order to properly engage the wind. As best shown, in FIGS. 6 and 7, turntable 44 is mounted upon a tower 46 that is supported above the ground by a series of pillars 48. This tower 46 incorporates rolling means that include a circular ring or track 50 having an upper generally flat surface 52. A series of casters 54 secured to turntable 44 roll on this generally flat surface 52, thereby permitting turntable 44 to rotate as needed. A shield 56 encloses these casters 54 and track 50 so as to provide weather protection and to prevent any foreign object from building up upon track 50 which might prevent or hinder the rolling of casters 54.

Figures 6, 7:
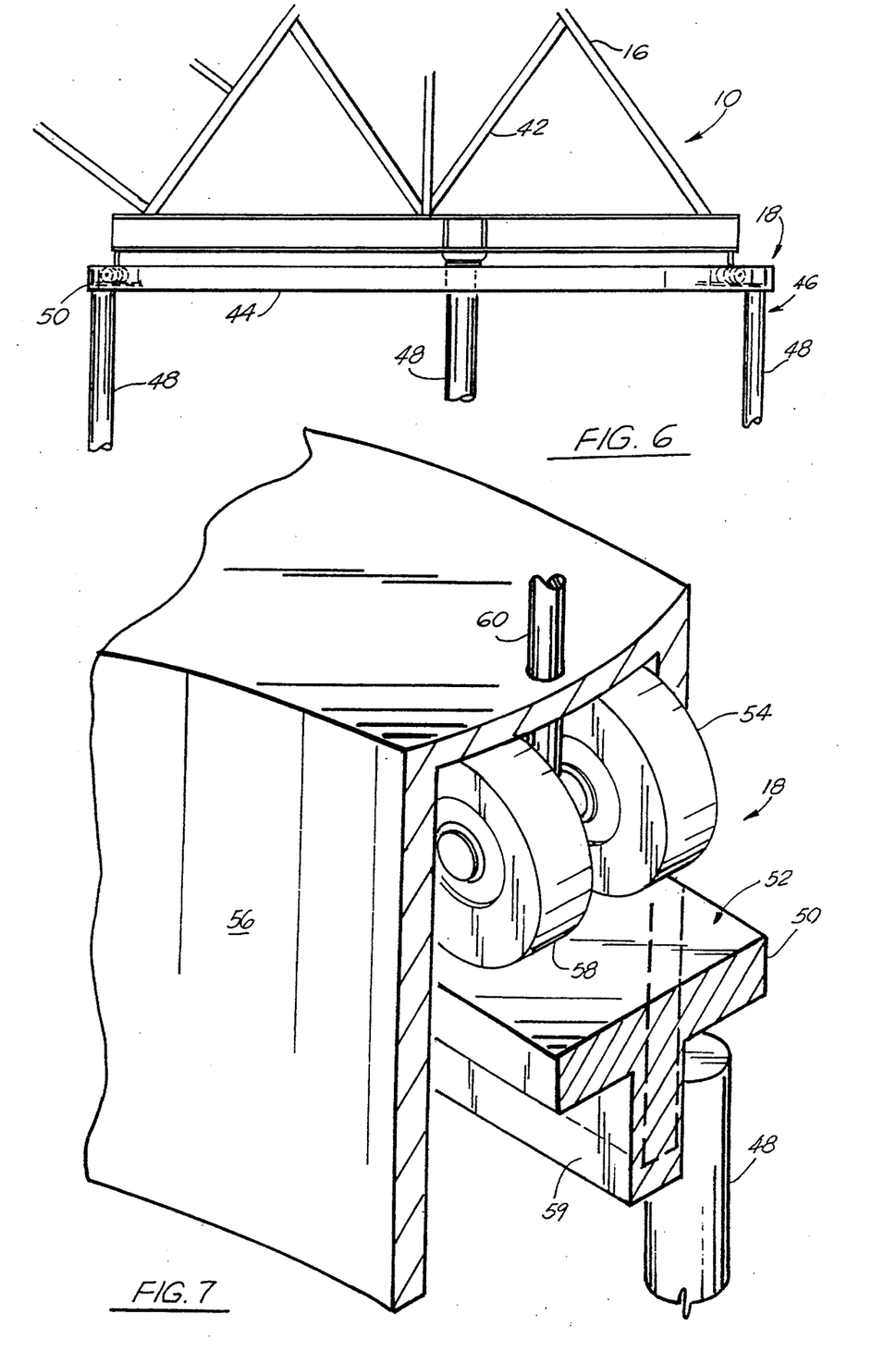
FIG. 6 is a pictorial view, partially broken away, illustrating the manner and means by which the wind turbine is supported.
FIG. 7 is a pictorial view, partially broken away, illustrating in greater detail the manner and means by which the wind turbine is supported and rotates.

As shown in this preferred embodiment in FIG. 7, each caster 54 consists of a pair of wheels 58 secured to shield 56 via pin 60. Additionally, track 50 may consist of a structural member in the shape of a "T" which is bent to form a large ring or circle. Pillars 48 may be welded or otherwise secured to the depending portion 59 of this "T" shaped structural member. In the alternate embodiment illustrated in FIG. 1A, only one pillar 48 is used to support track 50, however, in an preferred embodiment illustrated in FIG. 6, several such pillars may be used to support track 50 above the ground.

Referring now to FIG. 4, there is shown a partial side view of wind collector 12. Also shown is one embodiment of mechanical means 20 used to convert the collected wind energy into mechanical energy. This version of mechanical means 20 consists of a series of rollers 62 that engage sides 38 of drum 36. Thus, as wind collector 12 is rotated, the rotation of drum 36 causes these rollers 62 to also rotate. Ideally, these rollers 62 would be connected to a central axis of a generator or an alternator or the like (not shown). Thus, by this configuration, there may be multiple take-off points such that multiple generators or alternators may be driven by wind collector 12. It is also possible to secure a generator or an alternator or the like to central axis or drive shaft 34 in the conventional manner so as to further increase the number of mechanical means 20 driven by wind turbine 10.

Each of these generators or alternators would preferably be sequentially phased and would go "on-line" or "off-line" in response to the amount of wind energy being collected. These devices can be controlled by electronic switches which are activated by the rotational speed of wind collector 12 or by some other method of control.

Figure 9:
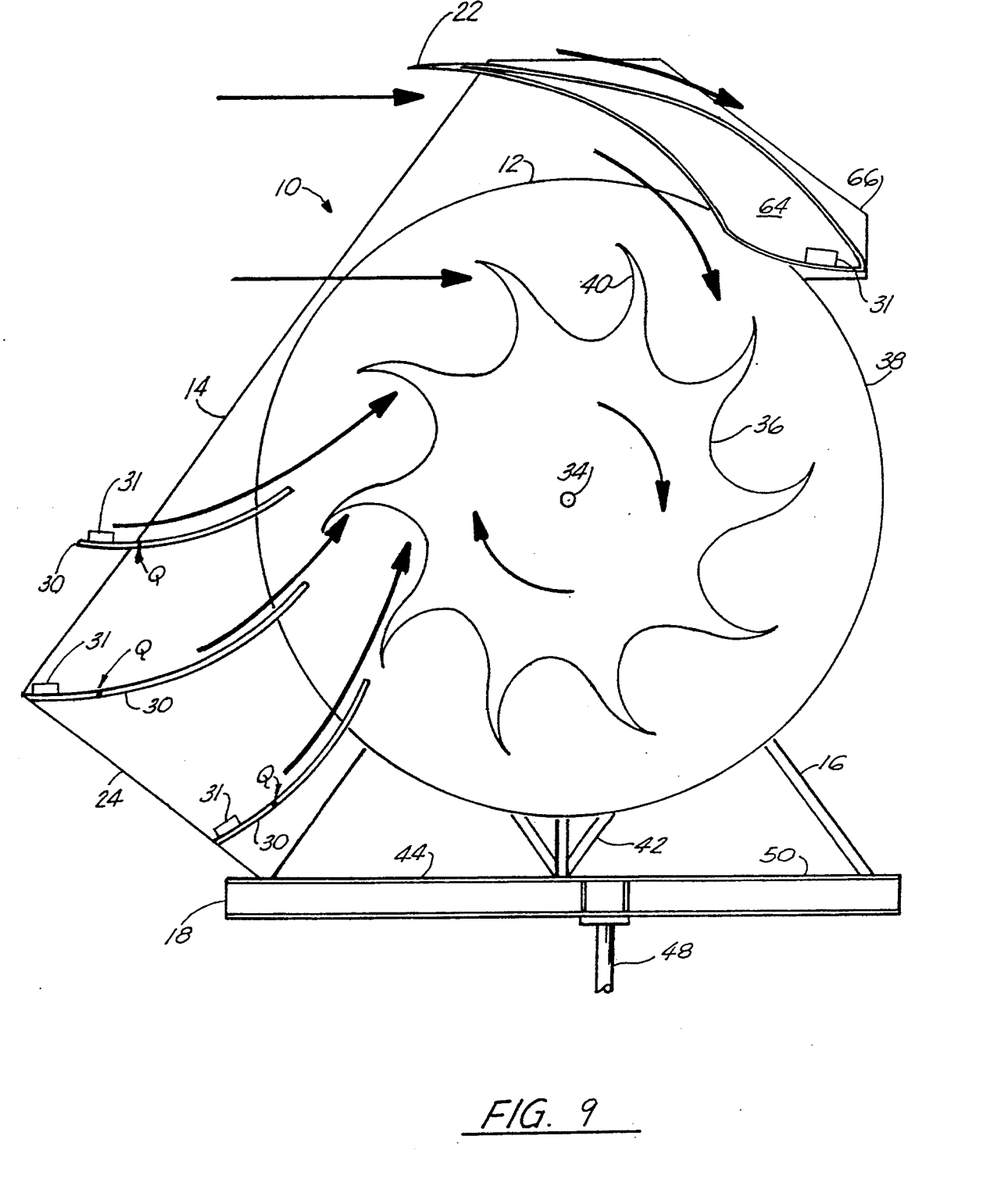

As best seen in FIG. 9, an after foil 64 extends or is located behind wind collector 12 in order to create a negative pressure which will tend to draw air from the area behind wind collector 12, thereby enhancing the rotation of wind collector 12. The purpose of after foil 64 is to prevent any build-up of positive pressure immediately behind wind collector 12 which would then effect the flow of air across wind collector 12.

To further enhance the operation of wind turbine 10, a series of balance plates 66 are mounted perpendicular to upper and lower channeling shrouds 22 and 30 for the purpose of balancing wind collector 12 upon turntable 44. These balance plates 66 can vary in size and shape and are configured to collect wind forces as necessary in order to offset the wind forces impacting upon wind turbine 10. Their purpose is to prevent any upset condition from occurring as a result of the wind forces striking wind collector 12. They are also designed to prevent any additional stress from building up upon casters 54 and turntable 44.

Since wind turbine 10 is designed for operation outdoors, it is equipped with severe weather protection including both ice protection and lighting protection. Such ice protection is incorporated into the areas which are primarily exposed to and subject to excessive icing that would otherwise cause an operational failure of wind turbine 10. This ice protection includes a continuous shield 56 above casters 54, a cover for the bearings used in central axis or drive shaft 34 and/or rollers 62, and a means and method of heating the surfaces of channeling shroud 14 among others. This means and method of heating channeling shroud 14 can, if desired, consist of a heating system for the entire inner area of wind turbine 10 such as through the use or propane or electric heating of the underside of skin 8 of receptor components 12, 14 and/or shrouds 22, 30. Alternatively, heat strips (not shown) can be imbedded within this skin 68 which can be activated as needed. Additionally, the outer surfaces of skin 68 of wind collector 12 and/or channeling shroud 14 can be composed of or coated with an ice-resistant paint or other slick material. Also, wind turbine 10 can be equipped with a switching mechanism which will shut turbine 10 down during periods of extreme weather or icing. This switch may be activated manually or in reaction to the additional weight resulting from ice build-up. Further, a retractable cover can be incorporated for the impact areas of wind turbine 10 such as wind collector 12 and/or channeling shroud 14.

Lighting protection for wind turbine 10 can take the form of dielectric components which will separate the bearing and electrical components from areas likely to be struck by lightning. Alternatively, wind turbine 10 can be equipped with lightning-rod devices 70 which will deliver any striking lightning to the ground.

Other embodiments of wind turbine 10 include a portable and a collapsible unit for use in camping, boating, and possibly military use. These wind turbines 10 would be made in a similar manner as disclosed above. Additionally, wind turbine 10 can be modified to capture the energy in moving water rather than wind energy as described above. These and other variations of wind turbine 10 are contemplated herein.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A wind-driven apparatus for generating rotational mechanical energy from a wind flow stream comprising:
    (a) a rotatable wind collector having a first axis of rotation, an entrance, an exit, and a plurality of elongated curved vanes located about its outer circumference and extending generally parallel to said first axis of rotation;
    (b) framework means for supporting said wind collector in an elevated rotatable position;
    (c) turntable means supporting said framework above the ground for turning or positioning said wind collector as desired, said turntable means incorporating covered rolling means comprising a track with casters rolling thereon for pivoting said wind collector about a second axis of rotation, said first and said second axes of rotation being generally orthogonal with respect to each other;
    (d) shroud means surrounding said entrance to said rotatable wind collector for directing wind forces onto said wind collector, said shroud means comprising pivotable upper and lower shroud members, said upper and said lower shrouds each being curved and converging towards said entrance to said wind collector, said upper and lower shrouds comprising balance weights to restrain them in place with respect to said wind collector; and,
    (e) foil means located along said exit of said wind collector for creating a negative pressure behind said wind collector.

2. The apparatus as set forth in claim 1, wherein said wind collector is a closed drum with solid side walls.

3. The apparatus as set forth in claim 1, wherein said wind collector is an open drum supported by spokes emanating from said first axis of rotation.

4. The apparatus as set forth in claim 1, further comprising means for protecting said wind collector from lightning.

5. The apparatus as set forth in claim 1, further comprising balance plate means for adjusting the position of said wind collector about said second axis of rotation, said balance plate means balancing said wind collector on said turntable and, if necessary, offsetting said wind collector during periods of high wind.

* * * * *